(12) United States Patent
Nilsson et al.

(10) Patent No.: US 10,850,742 B2
(45) Date of Patent: Dec. 1, 2020

(54) SAFETY STOPPAGE DEVICE AND AUTONOMOUS ROAD VEHICLE EQUIPPED THEREWITH

(71) Applicant: VOLVO CAR CORPORATION, Gothenburg (SE)

(72) Inventors: Jonas Nilsson, Molndal (SE); Mathias Westlund, Lerum (SE)

(73) Assignee: VOLVO CAR CORPORATION, Gothenburg (SE)

( * ) Notice: Subject to any disclaimer, the term of this patent is extended or adjusted under 35 U.S.C. 154(b) by 175 days.

(21) Appl. No.: 15/891,647

(22) Filed: Feb. 8, 2018

(65) Prior Publication Data

US 2018/0229738 A1 Aug. 16, 2018

(30) Foreign Application Priority Data

Feb. 15, 2017 (EP) .................................... 17156156

(51) Int. Cl.
*B60W 50/029* (2012.01)
*B60T 8/1755* (2006.01)
(Continued)

(52) U.S. Cl.
CPC ............ *B60W 50/029* (2013.01); *B60T 7/12* (2013.01); *B60T 8/17558* (2013.01);
(Continued)

(58) Field of Classification Search
USPC .......................................................... 701/43
See application file for complete search history.

(56) References Cited

U.S. PATENT DOCUMENTS 9,452,760 B2 9/2016 Oyama et al.
9,610,947 B2 4/2017 DeBruin et al.
(Continued)

FOREIGN PATENT DOCUMENTS

CN 101549707 A 10/2009
CN 102632877 A 8/2012
(Continued)

OTHER PUBLICATIONS

Extended European Search Report for European Application No. EP 17156156.6, completed by the European Patent Office, dated Jul. 28, 2017, 8 pages.

(Continued)

*Primary Examiner* — Aniss Chad
*Assistant Examiner* — Mahmoud M Kazimi
(74) *Attorney, Agent, or Firm* — Brooks Kushman P.C.

(57) ABSTRACT

A safety stoppage device for an autonomous road vehicle having at least one control network and sensor, and an autonomous drive-control unit for processing sensor and communication signals and providing control signals for lateral and longitudinal control. A primary brake-control unit is configured to monitor the longitudinal control signals for faults and, upon determination of a fault, execute a longitudinal control profile, stored independent from the autonomous drive-control unit, to perform braking to a stop. A primary steering-control unit is configured to monitor the lateral control signals for faults and, upon determination of a fault, control a primary steering actuator to follow a lateral control trajectory, stored independent from the autonomous drive-control unit, and, if not already triggered, simultaneously trigger the primary brake-control unit to execute the stored longitudinal control profile to control wheel brakes to perform braking to a stop during execution of the lateral control trajectory.

16 Claims, 3 Drawing Sheets

(51) Int. Cl.
*B60T 7/12* (2006.01)
*B60W 10/184* (2012.01)
*B60W 50/02* (2012.01)
*G05D 1/02* (2020.01)
*B60W 40/105* (2012.01)
*B60W 50/023* (2012.01)
*G05D 1/00* (2006.01)
*B60W 10/20* (2006.01)

(52) U.S. Cl.
CPC .......... *B60W 10/184* (2013.01); *B60W 10/20* (2013.01); *B60W 40/105* (2013.01); *B60W 50/023* (2013.01); *B60W 50/0205* (2013.01); *G05D 1/0077* (2013.01); *G05D 1/021* (2013.01); *B60T 2201/02* (2013.01); *B60T 2210/32* (2013.01); *B60T 2260/02* (2013.01); *B60T 2270/402* (2013.01); *B60T 2270/413* (2013.01); *B60W 2050/021* (2013.01); *B60W 2050/0292* (2013.01); *B60W 2050/0295* (2013.01); *B60W 2050/0297* (2013.01); *G05D 2201/0213* (2013.01)

(56) References Cited

U.S. PATENT DOCUMENTS

| | | | |
|---|---|---|---|
| 9,630,621 B2 | 4/2017 | Kurata | |
| 9,663,104 B2 | 5/2017 | Hauler et al. | |
| 10,214,235 B2 | 2/2019 | Sasaki et al. | |
| 2011/0066320 A1* | 3/2011 | Bechtler | G01P 21/00 |
| | | | 701/29.2 |
| 2011/0241862 A1* | 10/2011 | Debouk | B60W 50/038 |
| | | | 340/439 |
| 2012/0203435 A1 | 8/2012 | Braennstroem et al. | |
| 2013/0274985 A1* | 10/2013 | Lee | B60W 10/20 |
| | | | 701/23 |
| 2014/0277893 A1* | 9/2014 | Rosol | B60W 10/20 |
| | | | 701/23 |
| 2015/0120144 A1* | 4/2015 | De Bruin | B60T 8/17557 |
| | | | 701/41 |
| 2016/0368491 A1* | 12/2016 | Hauler | B60T 7/22 |
| 2019/0118786 A1* | 4/2019 | Wulf | B60T 13/662 |
| 2019/0193776 A1* | 6/2019 | Tsubaki | B62D 5/0484 |

FOREIGN PATENT DOCUMENTS

| | | | | |
|---|---|---|---|---|
| CN | 104470775 A | 3/2015 | | |
| CN | 105358396 A | 2/2016 | | |
| CN | 105460008 A | 4/2016 | | |
| CN | 106029471 A | 10/2016 | | |
| CN | 106029476 A | 10/2016 | | |
| DE | 102012211901 A1 | 1/2014 | | |
| DE | 102013213171 A1 | 1/2015 | | |
| DE | 102014213171 A1 | 10/2015 | | |
| DE | 102015003124 A | 9/2016 | | |
| DE | 102015003124 A1 * | 9/2016 | ........... G05D 1/0214 | |
| DE | 102015003124 A1 | 9/2016 | | |
| EP | 2314490 A1 | 4/2011 | | |

OTHER PUBLICATIONS

Chinese Office Action, Application No. 201810111457.8, Volvo Motor Company, dated Jul. 23, 2020, 12 pages.

Chinese Office Action, Application No. 201810111457.8, Volvo Motor Company, dated Jul. 23, 2020, (English) Machine Translation, 8 pages.

Chinese Search Report, Application No. 201810111457.8, Volvo Motor Company, dated Jul. 17, 2020, 2 pages.

* cited by examiner

SAFETY STOPPAGE DEVICE AND AUTONOMOUS ROAD VEHICLE EQUIPPED THEREWITH

CROSS-REFERENCE TO RELATED APPLICATIONS

This application claims foreign priority benefits under 35 U.S.C. § 119(a)-(d) to European patent application number EP 17156156.6, filed Feb. 15, 2017, which is incorporated by reference in its entirety.

TECHNICAL FIELD

The present disclosure relates to a safety stoppage device adapted for an autonomous road vehicle having a primary brake system including a primary brake-control unit and a primary brake circuit operatively connected to wheel brakes and a primary steering system including a primary steering-control unit and a primary steering actuator operatively connected to steerable wheels, the autonomous road vehicle further having control networks and sensors for monitoring the autonomous road vehicle surroundings and motion, and an autonomous drive-control unit for processing sensor- and communication-signals and providing control signals for lateral and longitudinal control enabling continuous autonomous drive of the vehicle.

The disclosure further relates to an autonomous road vehicle having a primary brake system including a primary brake-control unit and a primary brake circuit operatively connected to wheel brakes and a primary steering system including a primary steering-control unit and a primary steering actuator operatively connected to steerable wheels, the autonomous road vehicle further having control networks and sensors for monitoring the autonomous road vehicle surroundings and motion, and an autonomous drive-control unit for processing sensor- and communication-signals and providing control signals for lateral and longitudinal control enabling continuous autonomous drive of the vehicle which comprises a safety stoppage device.

BACKGROUND

One area of automotive vehicle technology that is evolving rapidly is the area of autonomous or semi-autonomous drive capabilities. This is enabled through the introduction of sensors, for sensing vehicle motion and surroundings, and actuators, for controlling different vehicle functionalities, such as steering, throttling and braking. Increased on-board data processing capabilities ties together these sensors and actuators such that the autonomous or semi-autonomous drive capabilities are enabled.

When the vehicle runs in autonomous mode, which means that a driver thereof is not required to perform maneuvers, the vehicle usually is dependent on multiple data sources as inputs to perform the autonomous driving, such as detection of surrounding vehicles, traffic lanes, obstacles, data from navigation systems and so on. Provisions of such inputs are usually dependent on control networks, sensors and signaling systems for enabling the autonomous drive mode.

In the case where an automated function takes responsibility for a particular driving task, the manufacturer of the system is normally required to show that the level of risk is sufficiently low. For an autonomous road vehicle, this usually means that the system is capable to plan and realize a safe vehicle trajectory for all possible situations.

Hence, in case the vehicle cannot guarantee safe driving over a longer time horizon, it thus may hand over control to the driver or bring the vehicle to a safe stop. This may be required if for instance a fault is detected on a vital system component.

Thus there is a need for a solution to safely handle a situation where a severe system fault, renders control systems of an autonomous road vehicle unable to maintain ongoing performance of safe autonomous driving.

SUMMARY

Embodiments herein aim to provide an improved safety stoppage device capable to safely bring an autonomous road vehicle to a halt in case of a severe system fault rendering the control systems thereof unable to perform autonomous driving.

This is provided through a safety stoppage device adapted for an autonomous road vehicle having a primary brake system including a primary brake-control unit and a primary brake circuit operatively connected to wheel brakes and a primary steering system including a primary steering-control unit and a primary steering actuator operatively connected to steerable wheels, the autonomous road vehicle further having control networks and sensors for monitoring the autonomous road vehicle surroundings and motion, and an autonomous drive-control unit for processing sensor- and communication-signals and providing control signals for lateral and longitudinal control enabling continuous autonomous drive of the vehicle, where the safety stoppage device further comprises that: the primary brake-control unit is arranged or configured to monitor the longitudinal control signals for faults and upon determination of a such fault it is arranged or configured to execute a longitudinal control profile, stored independent from the autonomous drive-control unit, to control the wheel brakes to perform braking to a stop; and the primary steering-control unit further is arranged or configured to monitor the lateral control signals for faults and upon determination of a such fault it is arranged or configured to control the primary steering actuator to follow a lateral control trajectory, stored independent from the autonomous drive-control unit, and, if not already triggered, simultaneously trigger the primary brake-control unit to execute the stored longitudinal control profile to control the wheel brakes to perform braking to a stop during execution of the lateral control trajectory.

According to a second embodiment it further comprises: a redundant brake system including a secondary brake-control unit and a secondary brake circuit operatively connected to the wheel brakes, and a redundant steering system including a secondary steering-control unit and a secondary steering actuator operatively connected to the steerable wheels, where the secondary brake-control unit in case of a primary brake system fault is arranged or configured to override execution of any longitudinal control profile by the primary brake-control unit and to receive from the autonomous drive-control unit the control signals for longitudinal control and execute longitudinal control of the vehicle based thereupon; where the secondary steering-control unit in case of a primary steering system fault is arranged or configured to override execution of any lateral control trajectory by the primary steering-control unit and to receive from the autonomous drive-control unit the control signals for lateral control and to execute lateral control of the vehicle based thereupon; where the secondary brake-control unit, when active due to a primary brake system fault, further is arranged or configured to monitor the longitudinal control signals for faults and upon determination of a such fault it is arranged or configured to execute a longitudinal control profile, stored independent from the autonomous drive-control unit, to control the wheel brakes to perform braking to a stop; and the secondary steering-control unit, when active due to a primary steering system fault, further is arranged or configured to monitor the lateral control signals for faults and upon determination of a such fault is arranged or configured to control the secondary steering actuator to follow a lateral control trajectory, stored independent from the autonomous drive-control unit, and, if not already triggered, simultaneously trigger the active one of the primary and the secondary brake-control units to execute its associated longitudinal control profile to control the wheel brakes to perform braking to a stop.

The provision of redundant brake and steering systems provides for a robust solution, should either of primary brake and steering systems encounter problems affecting their availability.

According to a third embodiment the autonomous drive-control unit is arranged or configured to either continuously calculate a longitudinal control profile to a stop and to send the most recently calculated longitudinal control profile to a stop for storage independent from the autonomous drive-control unit, or to use a fixed pre-defined longitudinal control profile to a stop stored independent from the autonomous drive-control unit.

The provision of controlling the wheel brakes to follow the most recently calculated longitudinal control profile or a fixed pre-defined longitudinal control profile to a stop provides for improved safety of the stoppage maneuver.

According to a fourth embodiment the autonomous drive-control unit further is arranged or configured to continuously calculate a lateral control trajectory and to send the most recently calculated lateral control trajectory for storage independent from the autonomous drive-control unit.

The provision to continuously calculate a lateral control trajectory and to send the most recently calculated lateral control trajectory for storage independent from the autonomous drive-control unit provides an efficient way of ensuring that a recent a lateral control trajectory is available even if the autonomous drive-control unit should become unavailable.

According to a fifth embodiment each available steering-control unit is arranged or configured to execute the lateral control trajectory based on dead-reckoned vehicle positions obtained through vehicle motion measurements.

The provision of each available steering-control unit being arranged or configured to execute the lateral control trajectory based on dead-reckoned vehicle positions obtained through vehicle motion measurements provides robust vehicle positioning for executing the lateral control trajectory.

According to a sixth embodiment the vehicle motion measurements are provided by at least one of one or more wheel speed sensors and a respective first motion measurement device, such as a respective first inertial motion unit, integrated into each available steering-control unit.

The provision of motion measurements provided by at least one of one or more wheel speed sensors and a respective first motion measurement device, such as a respective first inertial motion unit, integrated into each available steering-control unit provides a suitable solution for providing robust vehicle positioning for executing the lateral control trajectory.

According to a seventh embodiment the vehicle motion measurements provided by the respective first motion measurement device in order to cancel slow bias drifts are arranged or configured to be continuously calibrated using vehicle motion measurements, provided by a respective second motion measurement device, such as a respective second inertial motion unit, external to each available steering-control unit, or provided through fusion of available vehicle positioning data.

The provision of the vehicle motion measurements provided by the respective first motion measurement device being arranged or configured to be continuously calibrated using vehicle motion measurements, provided by a respective second motion measurement device, such as a respective second inertial motion unit, external to each available steering-control unit, or provided through fusion of available vehicle positioning data provide a solution that allows for using a lower-quality, and therefore less expensive first motion measurement device, e.g. inertial motion unit, as compared to that of the previous embodiment making it possible to cancel slow bias drifts from the first motion measurement device as long as communication is available.

According to an eight embodiment the vehicle motion measurements are provided by at least one of one or more wheel speed sensors and a respective third motion measurement device, such as a respective third inertial motion unit, external to each available steering-control unit and communicated thereto using a respective dedicated robust communications link, such as a respective shielded communications link.

The provision of providing the vehicle motion measurements by at least one of one or more wheel speed sensors and a respective third motion measurement device external to each available steering-control unit using a respective dedicated robust communications link to communicate them thereto provides a solution with high robustness as the third motion measurement device will be free from any restrictions imposed by any available steering-control unit.

According to a ninth embodiment the autonomous drive-control unit further is arranged or configured to continuously calculate a pinion angle vector based on the lateral control trajectory and to send the most recently calculated pinion angle vector for storage independent from the autonomous drive-control unit and each available steering-control unit further is arranged or configured to, upon determination of a fault in the lateral control signals, control its associated steering actuator to execute the stored pinion angle vector instead of the lateral control trajectory.

The provision of continuously calculating a pinion angle vector based on the lateral control trajectory and sending the most recently calculated pinion angle vector for storage independent from the autonomous drive-control unit in anticipation of being executed, and each available steering-control unit further being arranged or configured to, upon determination of a fault in the lateral control signals, control its associated steering actuator to execute the stored pinion angle vector instead of the lateral control trajectory provides a solution that eliminates the need for any other motion measurements than the measurement of pinon angle for executing the stored pinion angle vector to provide lateral control.

According to a tenth embodiment it further is arranged or configured to determine any brake system or steering system faults requiring an action by the autonomous drive-control unit, such as handover of control of the autonomous road vehicle to a driver thereof or provision of a degraded autonomous control mode, such as a degraded autonomous control mode allowing autonomous travel with reduced velocity, and further that, if the required action has not already been taken by the autonomous drive-control unit within a predetermined time period Δt following determination of such a fault, the brake-control and steering-control units are arranged or configured to control the wheel brakes to perform braking to a stop and the active steering actuator to follow the lateral control trajectory.

The provision of the safety stoppage device further being arranged or configured to determine any brake system or steering system faults requiring an action by the autonomous drive-control unit, as above, and further that, if the required action has not already been taken by the autonomous drive-control unit within a predetermined time period Δt following determination of such a fault, the brake-control and steering-control units are arranged or configured to control the wheel brakes to perform braking to a stop and the active steering actuator to follow the lateral control trajectory provides a solution that ensures that safe stoppage is provided even if the fault initially has prevented triggering and execution of a safe stoppage maneuver.

According to an eleventh embodiment the brake-control and steering-control units further are arranged or configured to determine the type of fault and to set the predetermined time period Δt in dependence on the determined type of fault.

The provision of determining the type of fault and setting the predetermined time period Δt in dependence on the determined type of fault provides a solution that makes it possible to allow more time for less severe faults and to reduce the reaction time for more severe faults.

According to a twelfth embodiment the brake-control and steering-control units further are arranged or configured to set the predetermined time period Δt in dependence on the current vehicle context, such as vehicle travelling velocity.

The provision of setting the predetermined time period Δt in dependence on the current vehicle context provides a solution that makes it possible to provide for enhanced safety, e.g. by reducing the reaction time if the vehicle travelling velocity is increased and vice versa.

According to a thirteenth embodiment any lateral control trajectories or pinion angle vectors are arranged or configured to be allocated and stored to any available steering-control unit and any lateral control trajectories are arranged or configured to be allocated and stored to any available brake-control unit.

The provision of allocating and storing any lateral control trajectories or pinion angle vectors to any available brake-control unit provides a suitable solution for ensuring that safe stoppage can be provided if the autonomous drive-control unit, or communication therewith, becomes unavailable.

According to a fourteenth embodiment it further comprises one or more optional lateral and longitudinal control units arranged or configured close to the brake and steering systems and for secured communication with brake and steering-control units thereof, to which optional lateral and longitudinal control units any lateral control trajectories, pinion angle vectors and longitudinal control profiles can be allocated and stored independent from the autonomous drive-control unit.

The provision of one or more optional lateral and longitudinal control units arranged or configured close to the brake and steering systems and for secured communication therewith, to which optional lateral and longitudinal control units any lateral control trajectories, pinion angle vectors and longitudinal control profiles can be allocated and stored provides an alternative suitable solution for ensuring that safe stoppage can be provided if the autonomous drive-control unit, or communication therewith, becomes unavailable.

According to a final embodiment an autonomous road vehicle is provided having a primary brake system including a primary brake-control unit and a primary brake circuit operatively connected to wheel brakes and a primary steering system including a primary steering-control unit and a primary steering actuator operatively connected to steerable wheels, the autonomous road vehicle further having control networks and sensors for monitoring the autonomous road vehicle surroundings and motion, and an autonomous drive-control unit for processing sensor- and communication-signals and providing control signals for lateral and longitudinal control enabling continuous autonomous drive of the vehicle, that comprises a safety stoppage device as above.

An autonomous road vehicle as above is able to safely bring itself to a halt in case of a severe system fault rendering the control systems thereof unable to perform autonomous driving.

BRIEF DESCRIPTION OF THE DRAWINGS

In the following, embodiments herein will be described in greater detail by way of example only with reference to attached drawings, in which.

Still other features of embodiments herein will become apparent from the following detailed description considered in conjunction with the accompanying drawings. It is to be understood, however, that the drawings are designed solely for purposes of illustration and not as a definition of the limits hereof, for which reference should be made to the appended claims. It should be further understood that the drawings are not necessarily drawn to scale and that, unless otherwise indicated, they are merely intended to conceptually illustrate the structures and procedures described herein

DETAILED DESCRIPTION

As required, detailed embodiments are disclosed herein. However, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

Figure 1:
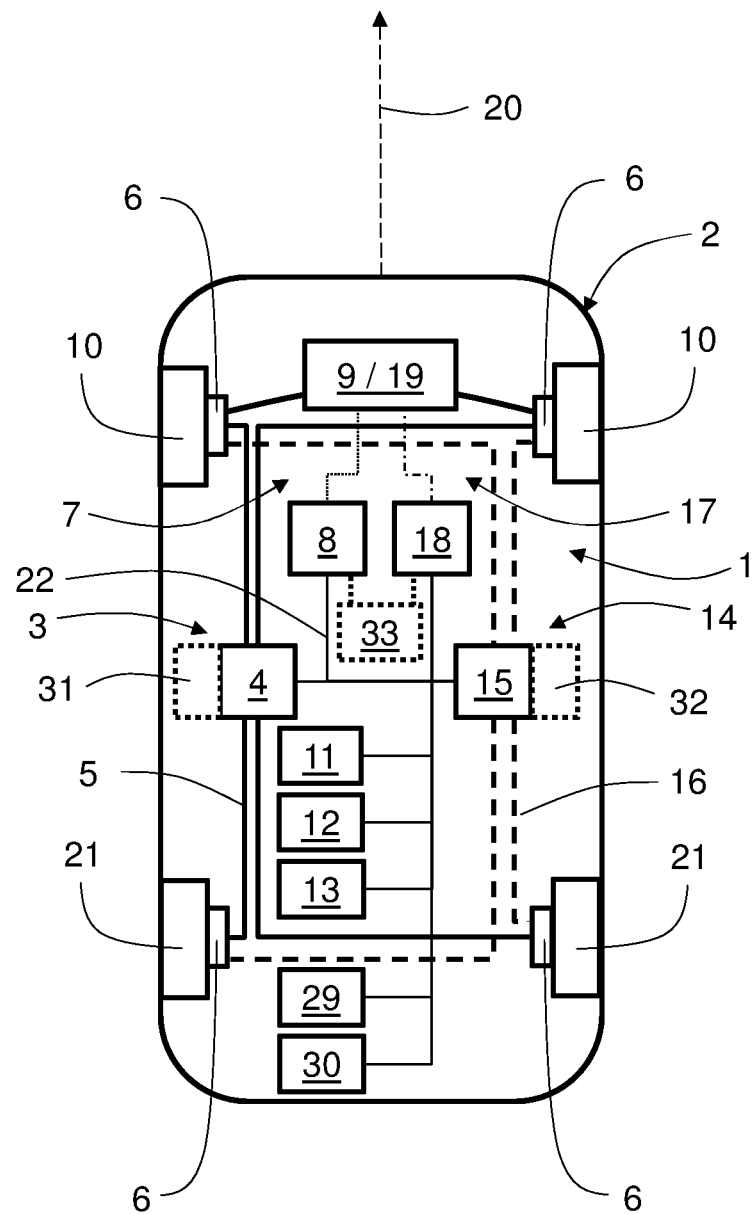
FIG. 1 is a schematic illustration of an autonomous road vehicle comprising a safety stoppage device according to embodiments herein.

The present disclosure proposes, and illustrates in FIG. 1, a solution to provide an improved safety stoppage device 1 capable to safely bring an autonomous road vehicle 2 to a halt in case of a fault. Multiple system components may malfunction simultaneously, e.g. due to loss of primary power or loss of communication due to electromagnetic interference (EMI), and there might not be sufficient information or functionality to perform autonomous driving.

The autonomous road vehicle 2 according to FIG. 1, a normally forward direction of travel of which is illustrated in FIG. 1 by the dashed arrow 20, comprises a primary brake system 3 including a primary brake-control unit 4 and a primary brake circuit 5 (full lines) operatively connected to wheel brakes 6 arranged at the respective wheels 10, 21 and a primary steering system 7 including a primary steering-control unit 8 and a primary steering actuator 9 operatively connected to steerable wheels 10 of the autonomous road vehicle 2, often the front end wheels 10 but occasionally the rear end wheels 21 or both. The primary steering-control unit 8 and the primary steering actuator 9 are operatively connected as illustrated by the dotted line there between in FIG. 1.

The autonomous road vehicle 2 further has control networks 11 and sensors 12 for monitoring the autonomous road vehicle 2 surroundings and motion, illustrated schematically by boxes in FIG. 1, and an autonomous drive-control unit 13 for processing sensor- and communication-signals and providing control signals for lateral and longitudinal control enabling continuous autonomous drive of the vehicle 2.

The sensors 12 may e.g. be based on camera, radar and lidar technologies, for monitoring the autonomous road vehicle 2 surroundings and, e.g. yaw-rate sensors, accelerometers, gyroscopes and wheel speed sensors, for monitoring motion of the autonomous road vehicle 2.

In order to ensure that the autonomous road vehicle 2 can be brought to a safe stop in case of a fault, even with limited or no communication, it is suggested to provide to the above described autonomous road vehicle 2 with a safety stoppage device 1.

In the safety stoppage device 1 the primary brake-control unit 4 is arranged or configured to monitor the longitudinal control signals for faults and upon determination of such a fault it is arranged or configured to execute a longitudinal control profile, stored independent from the autonomous drive-control unit 13, to control the wheel brakes 6 to perform braking to a stop.

The primary steering-control unit 8 is further arranged or configured to monitor the lateral control signals for faults and upon determination of a such fault it is arranged or configured to control the primary steering actuator 9 to follow a lateral control trajectory, stored independent from the autonomous drive-control unit 13, and, if not already triggered, simultaneously trigger the primary brake-control unit 4 to execute the stored longitudinal control profile to control the wheel brakes 6 to perform braking to a stop during execution of the lateral control trajectory.

Having the longitudinal control profile as well as the lateral control trajectory stored independent from the autonomous drive-control unit 13 ensures that the vehicle 2 can be brought to perform safe stoppage in the event that the autonomous drive-control unit 13, or communication therewith, becomes unavailable.

According to some further embodiments and in order to provide for robust solutions, should either of primary brake and steering systems 3, 7 encounter problems affecting their availability the safety stoppage device 1 further comprises a redundant brake system 14 including a secondary brake-control unit 15 and a secondary brake circuit 16, dashed lines, operatively connected to the wheel brakes 6.

The secondary brake circuit 16 may e.g. be realized using a normally provided dual-circuit braking system in which a respective of two separate circuits acts on both front wheels and one rear wheel. A first of such circuits could then be utilized as the primary brake circuit 5 and a second of such circuits as the secondary brake circuit 16.

The safety stoppage device 1 further comprises a redundant steering system 17 including a secondary steering-control unit 18 and a secondary steering actuator 19 operatively connected to the steerable wheels 10.

The secondary brake-control unit 15 is, in case of a primary brake system 3 fault, arranged or configured to override execution of any longitudinal control profile by the primary brake-control unit 4 and to receive from the autonomous drive-control unit 13 the control signals for longitudinal control and execute longitudinal control of the vehicle 2 based thereupon.

The secondary steering-control unit 18 is, in case of a primary steering system 7 fault, arranged or configured to override execution of any lateral control trajectory by the primary steering-control unit 8 and to receive from the autonomous drive-control unit 13 the control signals for lateral control and to execute lateral control of the vehicle based thereupon.

This provides redundancy should either of the primary systems experience a fault, such that autonomous driving may be maintained.

The secondary brake-control unit 15 is further, when active due to a primary brake system 3 fault, arranged or configured to monitor the longitudinal control signals for faults and upon determination of such a fault arranged or configured to execute a longitudinal control profile, stored independent from the autonomous drive-control unit 13, to control the wheel brakes 6 to perform braking to a stop.

The secondary steering-control unit 18 is further, when active due to a primary steering system 7 fault, arranged or configured to monitor the lateral control signals for faults and upon determination of a such fault arranged or configured to control the secondary steering actuator 19 to follow a lateral control trajectory, stored independent from the autonomous drive-control unit 13, and, if not already triggered, simultaneously trigger the active one of the primary and the secondary brake-control units 4, 15 to execute its associated longitudinal control profile to control the wheel brakes 6 to perform braking to a stop.

The secondary steering-control unit 18 and the secondary steering actuator 19 are operatively connected as illustrated by the dash-dotted line in FIG. 1. In case of the primary steering actuator 9 being an electrical motor of an electric power assisted steering (EPAS) the secondary steering actuator 19 may be embodied as a second separate winding of that electrical motor.

The autonomous drive-control unit 13 is further, in some embodiments, arranged or configured to either continuously calculate a longitudinal control profile to a stop, taking into account any obstacles present, such as other vehicles, pedestrians and fixed roadside objects, and to send the most recently calculated longitudinal control profile to a stop for storage independent from the autonomous drive-control unit 13, or to use a fixed pre-defined longitudinal control profile to a stop stored independent from the autonomous drive-control unit 13. The storage independent from the autonomous drive-control unit 13 comprises memory means, not shown, for facilitating storage of longitudinal control profiles to a stop thereby.

Triggering of the active one of the primary and the secondary brake-control units 4, 15 to execute its associated longitudinal control profile to control the wheel brakes 6 to perform braking to a stop may e.g. be performed by having the active one of the primary and the secondary steering-control units 8, 18 signal to the active one of the primary and the secondary brake-control units 4, 15 that it is in the process of following the most recently calculated lateral control trajectory, or alternatively by the active one of the primary and the secondary steering-control units 8, 18 continuously signaling to the active one of the primary and the secondary brake-control units 4, 15 that it is inactive and arranging the active one of the primary and the secondary brake-control units 4, 15 to be triggered if such signaling becomes absent.

The primary and secondary brake and steering control units 4, 15, 8, 18 and the control networks 11, sensors 12 and autonomous drive-control unit 13 are all suitably arranged or configured in communication with each other by an inter vehicle communication network 22, such as e.g. a Controller Area Network vehicle bus or similar.

Further details of the autonomous road vehicle 2, such as steering and throttling control systems etc., are intentionally left out from FIG. 1, in order to no unnecessarily obscure details promoting the understanding of the safety stoppage device 1 according to the present disclosure. However, the person skilled in the art will readily be able to envisage such further details.

According to some embodiments the autonomous drive-control unit 13 is further arranged or configured to continuously calculate a lateral control trajectory and to send the most recently calculated lateral control trajectory for storage independent from the autonomous drive-control unit 13. Through continuously calculating a lateral control trajectory and sending the most recently calculated lateral control trajectory for storage independent from the autonomous drive-control unit 13 is provided an efficient way of ensuring that a recent a lateral control trajectory is available, even if the autonomous drive-control unit 13 should become unavailable.

In further embodiments, each available steering-control unit 8, 18 is arranged or configured to execute the lateral control trajectory based on dead-reckoned vehicle positions obtained through vehicle motion measurements. Hereby is provided robust vehicle 2 positioning for executing the lateral control trajectory.

Figure 2:
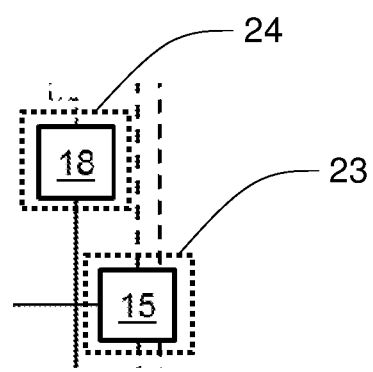
FIG. 2 is a schematic illustration of how the secondary brake-control unit and the secondary steering-control unit may be shielded against electromagnetic compatibility problems by a respective conductive enclosure according to some embodiments herein.

In further advantageous embodiments, as illustrated by the schematic partial cut-out view in FIG. 2, the secondary brake-control unit 15 and the secondary steering-control unit 18 are shielded against electromagnetic compatibility problems by a respective conductive enclosure 23, 24, such as a respective metal housing.

Such a conductive enclosure 23, 24 can e.g. provide electromagnetic interference (EMI) shielding by having metal coatings made by electroplating or vacuum deposition or be made of a composite material containing a conductive filler or from electrically conductive polymers, combinations thereof and similar, Hereby is provided an efficient way of ensuring that the secondary brake-control unit 15 and the secondary steering-control unit 18 will remain operational even if the control systems of the autonomous road vehicle 2 are rendered unable to perform autonomous driving due to electromagnetic compatibility problems.

In some such embodiments the conductive enclosures 23, 24 are a respective metal housing, which e.g. can provide EMI shielding through being made from sheet metal, a metal wire mesh, combinations thereof and similar. This is a well proven and cost effective way of providing protection against electromagnetic compatibility problems.

Should a power supply system of the autonomous road vehicle not shown be sensitive to electromagnetic compatibility problems, it may in some instances be necessary to ensure that the power supplies to the secondary brake-control unit 15 and the secondary steering-control unit 18 are adequately protected against such electromagnetic compatibility problems, e.g. by conductive shielding, as above.

It should be noted that the secondary brake-control unit 15 and the secondary steering-control unit 18 may be standard brake- and steering control units with their normally applied shielding against electromagnetic compatibility problems, although suitably adapted to be used with the safety stoppage device 1 as described herein. However, it is preferred that the shielding of the secondary brake-control unit 15 and the secondary steering-control unit 18 be performed to a higher standard than that of other vehicle components, such as the primary brake-control unit 4 and primary steering-control unit 8.

Figure 3A:
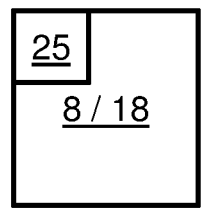
FIG. 3a is a schematic illustration of how, according to some embodiments herein, a first motion measurement device is integrated in an available steering-control unit.

In a first variant embodiment, illustrated schematically in FIG. 3a, each available steering-control unit 8, 18 is arranged or configured to execute the lateral control trajectory based on dead-reckoned vehicle positions obtained through vehicle motion measurements provided by at least one of one or more wheel speed sensors and a respective first motion measurement device 25, such as a respective first inertial motion unit, integrated into each available steering-control unit 8, 18. Hereby is provided a suitable solution for providing robust vehicle 2 positioning for executing the lateral control trajectory that benefits from a high-quality inertial motion unit able to provide high precision vehicle motion measurements.

Figure 3B:
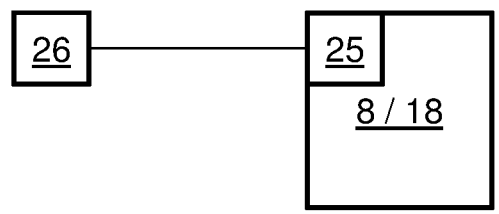
FIG. 3b is a schematic illustration of how vehicle motion measurements provided by the respective first motion measurement device according to FIG. 3a can be continuously calibrated in order to cancel slow bias drifts by communicating thereto vehicle motion measurements provided by a second motion measurement device external to an available steering-control unit.

According to a second variant embodiment, illustrated schematically in FIG. 3b, the vehicle motion measurements provided by the respective first motion measurement device 25 are, in order to cancel slow bias drifts, arranged or configured to be continuously calibrated using vehicle motion measurements, provided by a respective second motion measurement device 26, such as a respective second inertial motion unit, external to each available steering-control unit 8, 18, or provided through fusion of available vehicle positioning data. This solution allows for using integrated in each available steering-control unit 8, 18 a lower-quality, and therefore less expensive inertial motion unit, as compared to that of the first variant embodiment. The second variant embodiment makes it possible to remove any bias from the first motion measurement device 25 as long as communication is available. At loss of communication the first motion measurement device 25 would thus be free of bias and will only have to handle measurements during execution of the lateral control trajectory maneuver.

Figure 3C:
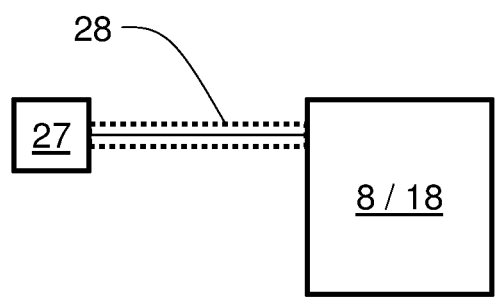
FIG. 3c is a schematic illustration of how vehicle motion measurements are provided by a third motion measurement device external to an available steering-control unit and communicated thereto using a dedicated robust communications link.

In a third variant embodiment, illustrated schematically in FIG. 3c, it is instead suggested that the vehicle motion measurements are provided by at least one of one or more wheel speed sensors and a respective third motion measurement device 27, such as a respective third inertial motion unit, external to each available steering-control unit 8, 18 and communicated thereto using a respective dedicated robust communications link 28, such as a respective shielded communications link. This solution is more robust as the third motion measurement device 27 is free from any restrictions imposed by an associated steering-control unit 8, 18. However, in order to guarantee availability the use of the dedicated robust communications link 28, e.g. appropriately shielded, is of paramount importance.

Thus, the first, second and third variant embodiments described above enables execution of the lateral control trajectory based on dead-reckoned vehicle position data.

Examples of further motion measurement device which could constitute or form part of the first, second and third motion measurement devices 25, 26, 27 described above include, but are not limited to, yaw-rate sensors, accelerometers, gyroscopes, inertial navigation or guidance systems, compasses, gyrocompasses, satellite navigation systems (e.g. The Global Positioning System (GPS)), and any combination of such elements, and possibly also signals from other sensors, such as e.g. wheel speed sensors, if available.

In order to eliminate the need for motion measurement, according to some further embodiments the autonomous drive-control unit 13 further is arranged or configured to continuously calculate a pinion angle vector based on the lateral control trajectory and to send the most recently calculated pinion angle vector for storage independent from the autonomous drive-control unit 13 and each available steering-control unit 8, 18 further is arranged or configured to, upon determination of a fault in the lateral control signals, control its associated steering actuator 9, 19 to execute the stored pinion angle vector instead of the lateral control trajectory. This solution requires that the longitudinal control profile is executed with precision and that the longitudinal control profile and the stored pinion angle vector are simultaneously triggered, and thus eliminates the need for any other motion measurements than the measurement of pinon angle for executing the safe vehicle trajectory. However, designing of the pinion angle trajectory will potentially require other inputs, such as vehicle dynamics parameters, friction and road geometry, e.g. banking.

According to yet some further embodiments the safety stoppage device 1 is further arranged or configured to determine any brake system 3, 14 or steering system 7, 17 faults requiring an action by the autonomous drive-control unit 13, such as handover of control of the autonomous road vehicle 2 to a driver thereof or provision of a degraded autonomous control mode, such as a degraded autonomous control mode allowing autonomous travel with reduced velocity, and further that, if the required action has not already been taken by the autonomous drive-control unit 13 within a predetermined time period Δt following determination of such a fault, the brake-control and steering-control units 4, 15, 8, 18 are arranged or configured to control the wheel brakes 6 to perform braking to a stop and the active steering actuator 9, 19 to follow the lateral control trajectory. This solution ensures that safe stoppage is provided even if the fault initially has prevented triggering and execution of a safe stoppage maneuver.

In some embodiments the brake-control and steering-control units 4, 15, 8, 18 are further arranged or configured to determine the type of fault and to set the predetermined time period Δt in dependence on the determined type of fault. This solution makes it possible to allow more time for less severe faults and to reduce the reaction time for more severe faults.

In accordance with yet some embodiments the brake-control and steering-control units 4, 15, 8, 18 are further arranged or configured to set the predetermined time period Δt in dependence on the current vehicle 2 context, such as vehicle 2 travelling velocity. This solution makes it possible to provide for enhanced safety, e.g. by reducing the reaction time if the vehicle travelling velocity is increased, as an increased velocity will place the vehicle 2 further along its trajectory per time unit if the travelling velocity is increased.

In accordance with still some further embodiments any lateral control trajectories or pinion angle vectors are arranged or configured to be allocated and stored to any available steering-control unit 8, 18 and any lateral control trajectories are arranged or configured to be allocated and stored to any available brake-control unit 4, 15. Through allocating and storing any lateral control trajectories or pinion angle vectors to any available brake-control unit 4, 15 is provided a suitable solution for ensuring that safe stoppage can be provided if the autonomous drive-control unit 13, or communication therewith, becomes unavailable.

According to yet some further embodiments, as illustrated by dashed boxes 31, 32, 33 in FIG. 1, the safety stoppage device 1 further comprises one or more optional lateral and longitudinal control units 31, 32, 33 arranged close to the brake and steering systems 3, 14, 7, 17 and for secured communication with brake and steering-control units 4, 15, 8, 18 thereof and, to which optional lateral and longitudinal control units 31, 32, 33 any lateral control trajectories, pinion angle vectors and longitudinal control profiles can be allocated and stored independent from the autonomous drive-control unit 13. The optional lateral and longitudinal control units 31, 32, 33 are normally arranged or configured to communicate with the autonomous drive-control unit 13, however the above arrangement provides an alternative suitable solution for ensuring that safe stoppage can be performed if the autonomous drive-control unit 13, or communication therewith, becomes unavailable.

As illustrated in FIG. 1, optional control unit 31 could typically be allocated to a primary brake system 3 and optional control unit 32 to a redundant brake system 14 and optional control unit 33, e.g. to both a primary steering system 7 and a redundant steering system 17. It is also possible that two or more of the optional control units 31, 32, 33 are integrated into one unit (not shown), which is internally redundant and connected to primary as well as secondary brake and steering systems 3, 14, 7 and 17.

Finally, the present disclosure also proposes an autonomous road vehicle 2 having a primary brake system 3 including a primary brake-control unit 4 and a primary brake circuit 5 operatively connected to wheel brakes 6 and a primary steering system 7 including a primary steering-control unit 8 and a primary steering actuator 9 operatively connected to steerable wheels 10, the autonomous road vehicle 2 further having control networks 11 and sensors 12 for monitoring the autonomous road vehicle 2 surroundings and motion, and an autonomous drive-control unit 13 for processing sensor- and communication-signals and providing control signals for lateral and longitudinal control enabling continuous autonomous drive of the vehicle 2, that comprises a safety stoppage device 1 as described above.

It should be noted that the primary brake systems 3, primary brake-control unit 4, primary brake circuit 5, primary steering system 7, primary steering-control unit 8, primary steering actuator 9, control networks 11, sensors 12, autonomous drive-control unit 13, redundant brake system, secondary brake-control unit 15, secondary brake circuit 16, redundant steering system 17, secondary steering-control unit 18, secondary steering actuator 19, vehicle communication network 22, first motion measurement device 25, second motion measurement device 26, third motion measurement device 27, communications link 28, lateral and longitudinal control units 31, 32, 33, as well as any other system, device, unit, arrangement or the like described herein may comprise and/or be implemented in or by one or more appropriately programmed processors (e.g., one or more microprocessors including central processing units (CPU)) and associated memory and/or storage, which may include operating system software, application software and/or any other suitable program, code or instructions executable by the processor(s) for controlling operation thereof, for providing and/or controlling interaction and/or cooperation between the various features and/or components described herein, and/or for performing the particular algorithms represented by the various functions and/or operations described herein.

An autonomous road vehicle 2, as described above, is able to safely bring itself to a halt in case of a fault as described above.

The above-described embodiments may be varied within the scope of the following claims.

Thus, while there have been shown and described and pointed out fundamental novel features of the embodiments herein, it will be understood that various omissions and substitutions and changes in the form and details of the devices illustrated, and in their operation, may be made by those skilled in the art. For example, it is expressly intended that all combinations of those elements and/or method steps which perform substantially the same function in substantially the same way to achieve the same results are equivalent. Moreover, it should be recognized that structures and/or elements and/or method steps shown and/or described in connection with any disclosed form or embodiment herein may be incorporated in any other disclosed or described or suggested form or embodiment as a general matter of design choice The foregoing disclosure has been set forth merely to illustrate example embodiments and is not intended to be limiting or to describe all possible forms of the disclosure. Rather, the words used in the specification are words of description rather than limitation, and it is understood that various changes may be made without departing from the spirit and scope of the disclosure. Since modifications of the disclosed embodiments incorporating the spirit and substance of the disclosure may occur to persons skilled in the art, the disclosure should be construed to include everything within the scope of the appended claims and equivalents thereof. Additionally, the features of various implementing embodiments may be combined to form further embodiments of the disclosure.

What is claimed is:

1. A safety stoppage device configured for an autonomous road vehicle having a primary brake system including a primary brake circuit operatively connected to wheel brakes and a primary steering system including a primary steering actuator operatively connected to steerable wheels, the autonomous road vehicle further having at least one control network and at least one sensor for monitoring the autonomous road vehicle surroundings and motion, and an autonomous drive-control unit for processing sensor and communication signals and providing control signals for lateral and longitudinal control enabling continuous autonomous drive of the vehicle, the safety stoppage device comprising:
    a primary brake-control unit configured to monitor the longitudinal control signals for faults and, upon determination of a fault in a longitudinal control signal, to execute a longitudinal control profile, stored independent from the autonomous drive-control unit, to control the wheel brakes to perform braking to a stop; and
    a primary steering-control unit configured to monitor the lateral control signals for faults and, upon determination of a fault in a lateral control signal, to control the primary steering actuator to follow a lateral control trajectory, stored independent from the autonomous drive-control unit, and, when not already triggered, trigger the primary brake-control unit to execute the stored longitudinal control profile to control the wheel brakes to perform braking to a stop during execution of the lateral control trajectory.

2. The safety stoppage device according to claim 1 further comprising:
    a redundant brake system including a secondary brake-control unit and a secondary brake circuit operatively connected to the wheel brakes, and a redundant steering system including a secondary steering-control unit and a secondary steering actuator operatively connected to the steerable wheels;
    wherein the secondary brake-control unit in response to a primary brake system fault is configured to override execution of any longitudinal control profile by the primary brake-control unit and to receive from the autonomous drive-control unit the control signals for longitudinal control and execute longitudinal control of the vehicle based thereupon;
    wherein the secondary steering-control unit in response to a primary steering system fault is configured to override execution of any lateral control trajectory by the primary steering-control unit and to receive from the autonomous drive-control unit the control signals for lateral control and to execute lateral control of the vehicle based thereupon;
    wherein the secondary brake-control unit, in response to a primary brake system fault, is further configured to monitor the longitudinal control signals for faults and upon determination of a longitudinal control signal fault it is configured to execute a longitudinal control profile, stored independent from the autonomous drive-control unit, to control the wheel brakes to perform braking to a stop; and
    wherein the secondary steering-control unit, in response to a primary steering system fault, is further configured to monitor the lateral control signals for faults and upon determination of a lateral control signal fault is configured to control the secondary steering actuator to follow a lateral control trajectory, stored independent from the autonomous drive-control unit, and, in response to an absence of a longitudinal control signal fault, trigger the active one of the primary and the secondary brake-control units to execute its associated longitudinal control profile to control the wheel brakes to perform braking to a stop.

3. The safety stoppage device according to claim 1 wherein the autonomous drive-control unit is configured to either continuously calculate a longitudinal control profile to a stop and to send the most recently calculated longitudinal control profile to a stop for storage independent from the autonomous drive-control unit, or to use a fixed pre-defined longitudinal control profile to a stop stored independent from the autonomous drive-control unit.

4. The safety stoppage device according to claim 1 wherein the autonomous drive-control unit is further configured to continuously calculate a lateral control trajectory and to send the most recently calculated lateral control trajectory for storage independent from the autonomous drive-control unit.

5. The safety stoppage device according to claim 1 wherein the steering-control unit is configured to execute the lateral control trajectory based on dead-reckoned vehicle positions obtained through vehicle motion measurements.

6. The safety stoppage device according to claim 5 wherein the vehicle motion measurements are provided by at least one of one or more wheel speed sensors and a respective first motion measurement device, such as a respective first inertial motion unit, integrated into the steering-control unit.

7. The safety stoppage device according to claim 6 wherein the vehicle motion measurements provided by the respective first motion measurement device in order to cancel slow bias drifts are configured to be continuously calibrated using vehicle motion measurements, provided by a respective second motion measurement device, such as a respective second inertial motion unit, external to each available steering-control unit, or provided through fusion of available vehicle positioning data.

8. The safety stoppage device according to claim 7 wherein the vehicle motion measurements are provided by at least one of one or more wheel speed sensors and a respective third motion measurement device, such as a respective third inertial motion unit, external to the steering-control unit and communicated thereto using a respective dedicated robust communications link, such as a respective shielded communications link.

9. The safety stoppage device according to claim 1 wherein the brake-control and steering-control units are further configured to determine any brake system or steering system faults requiring an action by the autonomous drive-control unit, and, in response to an absence of the required action by the autonomous drive-control unit within a predetermined time period (Δt) following determination of such a fault, the brake-control and steering-control units are configured to control the wheel brakes to perform braking to a stop and the active steering actuator to follow the lateral control trajectory.

10. The safety stoppage device according to claim 9 wherein the brake-control and steering-control units are further configured to determine the type of fault and to set the predetermined time period (Δt) in dependence on the determined type of fault.

11. The safety stoppage device according to claim 9 wherein the brake-control and steering-control units are further configured to set the predetermined time period (Δt) in dependence on the current vehicle context, such as vehicle travelling velocity.

12. The safety stoppage device according to claim 9 wherein the action required by the autonomous drive-control unit comprises handover of control of the autonomous road vehicle to a driver thereof or provision of a degraded autonomous control mode.

13. The safety stoppage device according to claim 12 wherein provision of a degraded autonomous control mode comprises provision of a degraded autonomous control mode allowing autonomous travel with reduced velocity.

14. The safety stoppage device according to claim 1 wherein any lateral control trajectories or pinion angle vectors are allocated and stored to the steering-control unit and any longitudinal control profiles are allocated and stored to the brake-control unit.

15. An autonomous road vehicle having a primary brake system including a primary brake circuit operatively connected to wheel brakes and a primary steering system including a primary steering actuator operatively connected to steerable wheels, the autonomous road vehicle further having at least one control network and at least one sensor for monitoring the autonomous road vehicle surroundings and motion, and an autonomous drive-control unit for processing sensor and communication signals and providing control signals for lateral and longitudinal control enabling continuous autonomous drive of the vehicle, the autonomous road vehicle comprising:
  a safety stoppage device including
    a primary brake-control unit configured to monitor the longitudinal control signals for faults and, upon determination of a fault in a longitudinal control signal, to execute a longitudinal control profile, stored independent from the autonomous drive-control unit, to control the wheel brakes to perform braking to a stop, and
    a primary steering-control unit configured to monitor the lateral control signals for faults and, upon determination of a fault in a lateral control signal, to control the primary steering actuator to follow a lateral control trajectory, stored independent from the autonomous drive-control unit, and, when not already triggered, trigger the primary brake-control unit to execute the stored longitudinal control profile to control the wheel brakes to perform braking to a stop during execution of the lateral control trajectory.

16. An autonomous road vehicle comprising:
  a primary brake system including a primary brake circuit operatively connected to wheel brakes;
  a primary steering system including a primary steering actuator operatively connected to steerable wheels;
  at least one control network and at least one sensor for monitoring surroundings and motion of the autonomous road vehicle;
  an autonomous drive-control unit configured to process sensor signals and provide control signals for lateral and longitudinal control enabling autonomous drive of the vehicle; and
  a safety stoppage device including
    a primary brake-control unit configured to monitor the longitudinal control signals for faults and, upon determination of a fault in a longitudinal control signal, to execute a longitudinal control profile, stored independent from the autonomous drive-control unit, to control the wheel brakes to perform braking to a stop, and
    a primary steering-control unit configured to monitor the lateral control signals for faults and, upon determination of a fault in a lateral control signal to control the primary steering actuator to follow a lateral control trajectory, stored independent from the autonomous drive-control unit, and, when not already triggered, to trigger the primary brake-control unit to execute the stored longitudinal control profile to control the wheel brakes to perform braking to a stop during execution of the lateral control trajectory.

* * * * *